Feb. 8, 1944.    F. W. McLARTY    2,341,109
COMBINED LAND AND MARINE VEHICLE
Filed Feb. 14, 1942    2 Sheets-Sheet 1
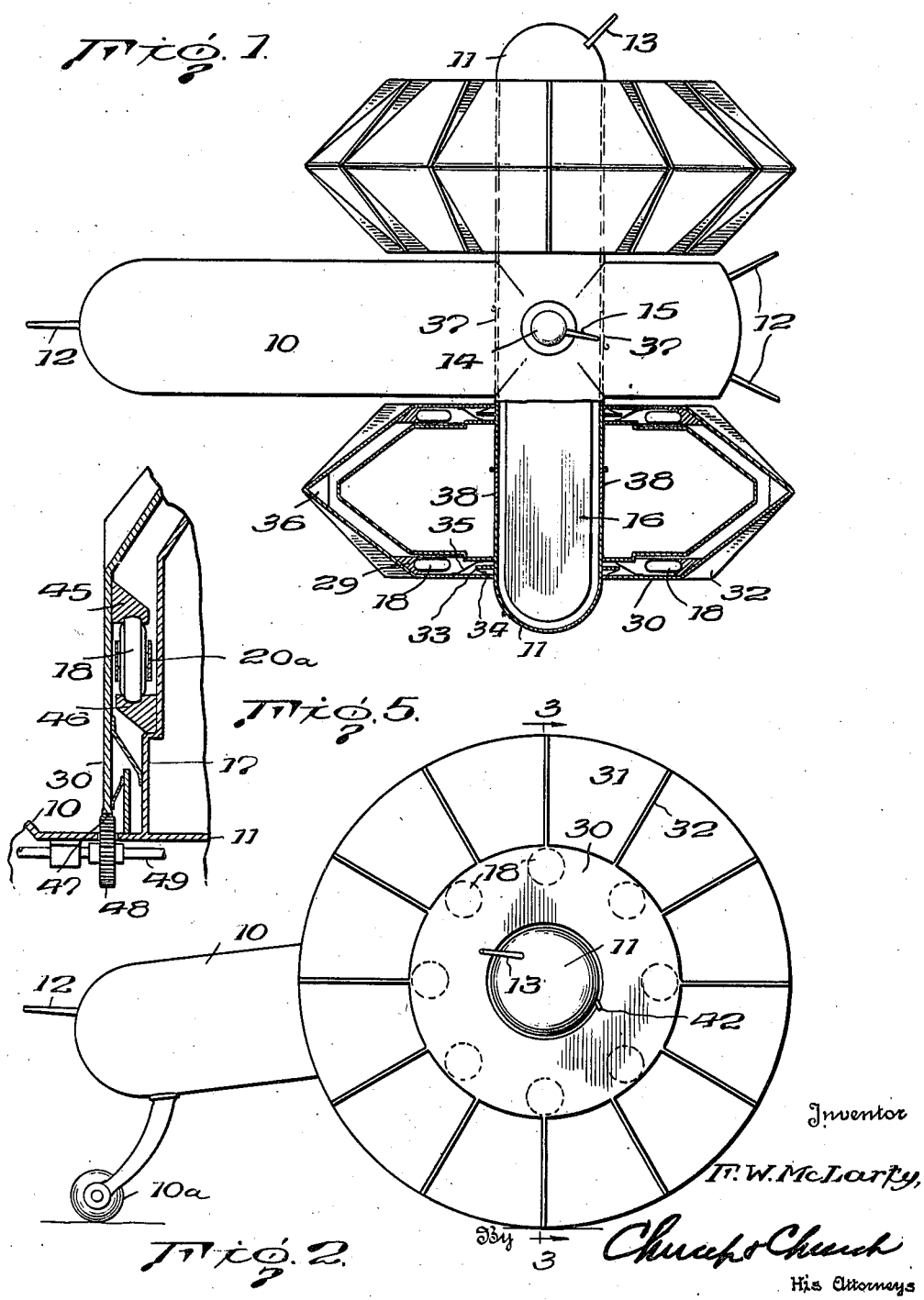

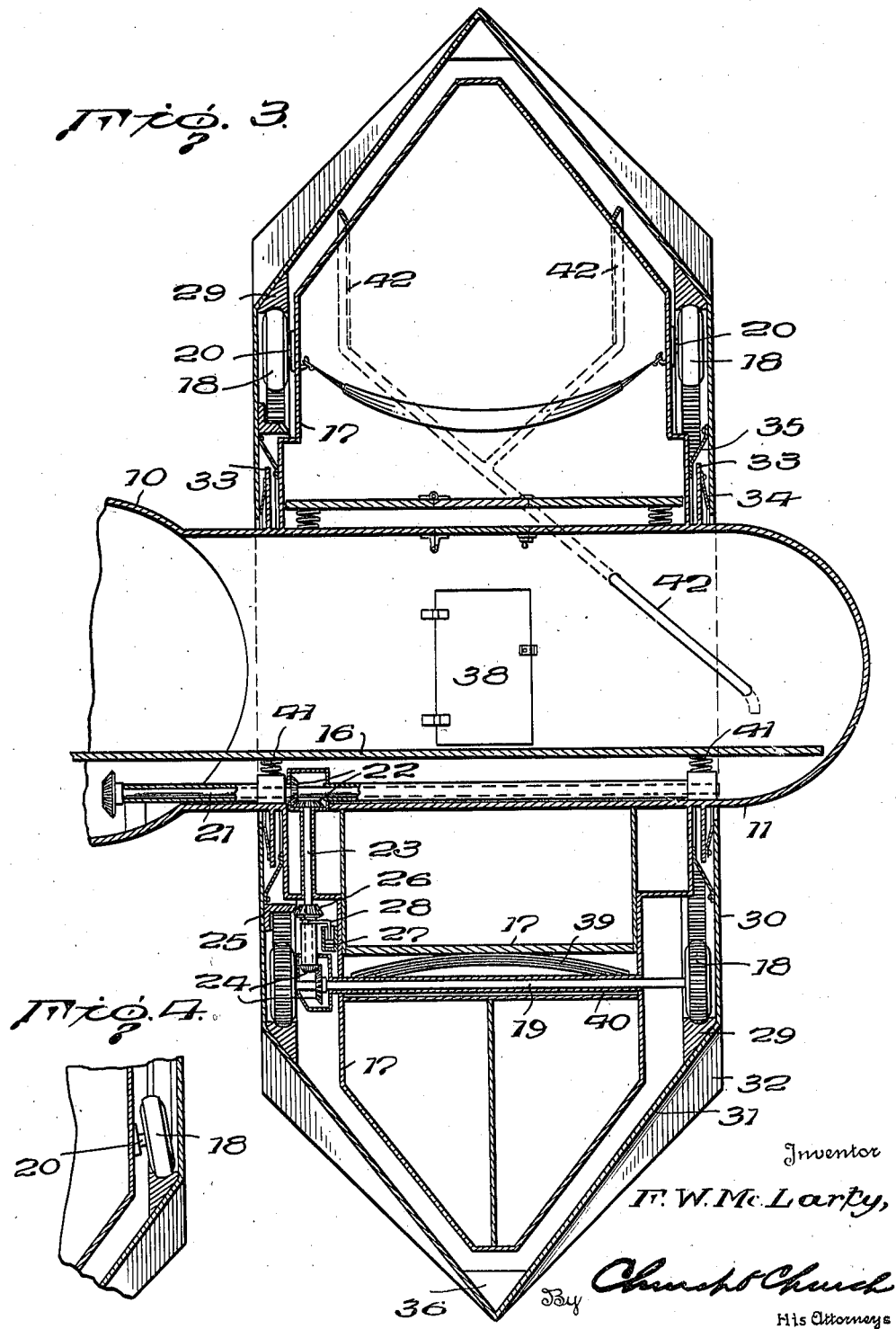

Patented Feb. 8, 1944

2,341,109

UNITED STATES PATENT OFFICE 2,341,109

COMBINED LAND AND MARINE VEHICLE

Frank W. McLarty, Vernon, Tex.

Application February 14, 1942, Serial No. 430,967

13 Claims. (Cl. 180—10)

This invention relates to improvements in combined land and marine vehicles.

The primary object is to provide a novel arrangement for increasing the buoyancy of vehicles of this type in connection with the propelling mechanism.

Another object is to provide a driving or propelling mechanism for a vehicle of this type which will afford considerable space in the form of compartments which may be used for storage or as quarters for operatives of the vehicles.

A still further object is to provide a vehicle of this type with multiple compartments which are readily accessible at all times, including those periods when the vehicle is used for marine purposes.

Still another object is to provide a vehicle for land or marine use which can be amply armed for military uses.

More specifically, the invention contemplates a combined land and water vehicle having a body portion, in which the power unit for propelling the vehicle is preferably housed, with a tubular member extending through and at opposite sides of said body. This tubular member is of such size as to provide accommodation for members of the vehicle crew and its ends are preferably formed to constitute side turrets for placement and protection of gun mounts. Traction members, for propelling the vehicle on land or in water are revolubly associated with the projecting portions of said tubular member and the size of these traction members is such that storage compartments or the like can be provided within said members between the latter and said tubular member. This not only provides or increases the buoyance of the vehicle as a whole, but the walls of said storage compartments can be utilized for supporting the major portion of the driving connections through which the traction members are actuated from the power unit.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a top plan view, partly broken away, of a vehicle embodying the present improvements;

Fig. 2 is a side elevation;

Fig. 3 is a sectional view on the line 3—3 of Fig. 2, illustrating, in greater detail, one of the traction members and its driving connections;

Fig. 4 is a detail view illustrating a modified mounting of the resilient supporting wheels for the traction members; and Fig. 5 is a detail view illustrating a further modification for mounting said supporting wheels and for driving the traction members.

Generally, the vehicle comprises a body portion 10 with traction members at opposite sides thereof. These traction members are adapted to revolve around a compartment for members of the vehicle crew and to also house quarters for the crew or storage compartments and might also house power units. As a consequence, they are made comparatively large and, for this reason, might be likened to endless tracks used on vehicles of the, so-called, tractor type. Preferably, the power unit for actuating these traction members is housed in the body portion 10.

Extending transversely of the body 10 and projecting from opposite sides thereof, are cylindrical or tubular members 11 closed at their outer ends. As the vehicle is primarily intended to serve as a tank of the armored type, guns 12 are mounted at the front and rear of body 10 and guns 13 are mounted at the ends of the tubular members 11. The ends of said members and body are, therefore, of rounded or curved contour to minimize the possibilities of those walls being penetrated by projectiles impacting against them. The body portion 10 may also be formed with a turret 14 for an anti-aircraft gun 15, and the body may be supported at its rear by "crazy" wheel 10a. The several guns are merely indicated more or less diagrammatically, as the method of mounting the same forms no part of the present invention. Where the members 11 are of cylindrical formation, a platform 16 is provided in the bottom thereof.

Located around and rigidly connected with each member 11, are a plurality of compartments 17, some of which may be used as storage compartments, for instance, for fuel, and others may be used as quarters for members of the crew. Preferably, the upper compartments, provided with suitable flooring, are used as quarters, and the remaining compartments are used for storage space. Journaled in the walls of these compartments are a number of shafts having rollers or wheels 18 mounted thereon for supporting and driving the traction members. At least one of said shafts, for instance, shaft 19, extends through and projects beyond the side walls of the lower compartment, while the remaining wheels may be mounted on stub shafts 20. Shaft 19 is adapted to be driven from a driving shaft 21 journaled in the compartment walls and connected through suitable power transmission means, of usual construction, to the power unit. Motion may be transmitted from shaft 21 to shaft 19 by co-operating gears 22 on shaft 21 and a connecting shaft 23 and similar gears 24 on said shaft 23 and shaft 19. The wheels or rollers 18 are preferably of the pneumatic type and engage a race or way 29 on the traction member, thus forming a friction drive for said member. As additional driving force may be required under certain circumstances, a rack 25 may be provided on the traction member and a gear 26 axially movable on the connecting shaft 23 can be engaged with said rack to increase the driving force. Manually controlled hydraulic means, comprising the cylinder and piston shown diagrammatically at 27, 28, may be utilized for connecting and disconnecting the gear 26 and rack 25. As stated, it is preferred that the drive from wheels 18 on shaft 19, to the traction members, be of the friction type, and to increase the friction the surfaces of the wheels on said shaft 19 and of the ways 29 may be corrugated. However, the remaining wheels 18, other than those on drive shaft 19, need not have corrugated surfaces. Also, as indicated, more than one drive shaft 19 with driving wheels 18 thereon may be used.

The traction members are preferably in the form of large cylindrical members having annular side walls 30 with a tapering peripheral portion 31 provided with cleats or vanes 32 which serve to give the vehicle traction either on land or in water. The breadth and diameter of these traction members, or, what might be called the shells constituting the same, is such that they are, essentially, traction members of the endless type and for this reason it will be appreciated that said members need not necessarily be formed with a rigid peripheral portion. Also, their size is such that ample clearance is provided between them and compartments 17 to accommodate the supporting and driving connections. A joint as water-tight as practical is formed between the shells of the traction members and the tubular members 11. In the present instance, annular radial flanges 33 are provided on the tubular members adjacent the walls of compartments 17, and reversely-disposed, resilient annular members 34, 35 on the inner surfaces of the traction member yieldingly engage against the flanges and compartment walls to form an effective seal. Any water that might gain access to the lower portion of the interior of the traction member, when the vehicle is operating in water, will be temporarily trapped in the space between the lower compartment and the traction member and carried by compartments 36 in the crown of the traction member to the upper portion of the rotary path of said member, where it will drain off and be discharged, for instance, through conduits 42. Due to the size of the traction members, which is relied upon in part to lend buoyancy to the vehicle, the amount of water that may be permanently trapped will not materially affect the buoyancy of the vehicle.

The joint between the tubular members 11 and body 10 is, of course, water-tight, and, where said members are formed by a single tubular member which actually extends through the body, doors 37 are provided for openings which give access to the front and rear portions of the body. Doors 38 are also provided for openings from the tubular member 11 to those compartments 17 to which members are to have access.

To reduce or absorb shocks imposed on the vehicle when operating over irregular or rough terrain, springs 39 may be interposed between the compartments 17 and bushings 40 for all of the shafts that may be used for driving the traction members, and additional springs 41 may be located beneath the platform 16 in tubular member 11. While it is preferred that a main power unit be located in body 10, the size of compartments 17 is such that they may house individual power units for the traction member. In order to increase the frictional drive through pneumatic wheels 18, the treads thereof are preferably corrugated as shown in Fig. 3. Also, the wheels 18 may be placed at an angle or tilted with respect to the axis of the traction member, as illustrated in Fig. 4, to absorb side thrust.

A further modification consists in mounting the wheels 18 free of the compartments or other fixed portions of the structure and permitting them to revolve around the tubular member 11. Thus, they will resiliently support the traction members with which they will revolve by reason of their frictional engagement therewith. Suitable driving connections can be provided for the traction members under such circumstances. For instance, as shown in Fig. 5, the wheels 18 can be retained by a core 28a between raceways 45, 46, on the members 30, 17, respectively, and the traction member 30 driven by gear 48 mounted on shaft 49 and projecting through member 11 for engagement with a ring gear 47 formed on the inner edge of the traction member.

What I claim is:

1. A propelling mechanism for vehicles comprising, in combination, a tubular member extending laterally from the body of the vehicle and adapted to accommodate one or more occupants, a cylindrical traction member adapted to revolve around said tubular member, said tubular member extending through said traction member and having a closed end exposed at the exterior side of the traction member, the peripheries of said tubular member and said traction member being spaced apart to provide storage space between the same, and driving connections from the body of said vehicle to said traction members.

2. A combination land and water vehicle propelling mechanism comprising, in combination, an endless traction member, a supporting member projecting laterally from the vehicle body and around which said traction member is adapted to revolve, shaft supporting means carried by said supporting member, a main driving shaft, a plurality of counter-shafts journaled in said shaft supporting member, rollers mounted on said counter-shafts frictionally engaging said traction member to revolve the same, a connecting shaft between said main driving shaft and certain of said counter-shafts, a rack on said traction member, and a gear on said connecting shaft movable into and out of engagement with said rack.

3. A combination land and water vehicle propelling mechanism comprising, in combination, an endless traction member, a member extending laterally from the vehicle body axially through said traction member said laterally extending member having a closed end exposed at the exterior of the traction member, there being storage compartments between said traction member and said axially disposed member, shafts journaled in the walls of said compartments, means for driving said shafts, and rollers fast on said shafts frictionally engaging said traction member to support and revolve the same around said axially disposed member and said compartments.

4. In a combined land and water vehicle having a main body portion, the combination of an enlarged tubular member extending through and projecting from opposite sides of the body, revoluble fraction members surrounding the projecting portions of said tubular member with the ends of the latter closed and exposed at the exterior sides of the traction members, and driving connections for rotating said traction members.

5. In a combined land and water vehicle having a main body portion, the combination of an enlarged tubular member extending through and projecting from opposite sides of the body, revoluble traction members surrounding the projecting portions of said tubular member with the ends of the latter closed and exposed at the exterior sides of the traction members, a plurality of shafts within said traction members, means carried by said tubular member in which said shafts are journaled, means for rotating said shafts, and means on said shafts for supporting and revolving said traction members.

6. A propelling mechanism for vehicles comprising, in combination, a main vehicle body portion, a tubular supporting member extending from opposite sides of the main body portion, a cylindrical traction member mounted to revolve on said supporting member, the peripheries of said tubular member and said traction member being spaced apart to provide storage space between the same, compartments in the space between said peripheries, pneumatic rollers housed within said traction member resiliently supporting the latter on said supporting member, and means for driving said traction member.

7. A propelling mechanism for a vehicle having a main body portion comprising, in combination, a tubular supporting member projecting from opposite sides of said body portion, a cylindrical traction member mounted to revolve on said supporting member, the peripheries of said tubular member and said traction member being spaced apart to provide storage space between the same, compartments in the space between said peripheries, pneumatic rollers housed within said traction member resiliently supporting the latter on said supporting member, endless ways on the traction member against which said rollers frictionally engage, said rollers being tilted with respect to the axis of said traction member, and means for driving said traction member.

8. In a vehicle having a main body portion, the combination of revoluble traction members, hollow lateral extensions at the sides of said body around which the traction members revolve, and driving connections for said traction members comprising rotatable pneumatic wheels supported on said lateral extensions, said pneumatic wheels frictionally engaging said traction members to drive the latter and constituting a resilient support for the traction members on said extensions.

9. In a vehicle having a main body portion, the combination of revoluble traction members, hollow lateral extensions at the sides of said body about which the traction members revolve, and means for resiliently supporting said revoluble traction members on said lateral extensions comprising circular ways on said traction members and pneumatic rollers journaled on said extensions engaging said ways to compensate for inequalities in said ways.

10. In a vehicle having a main body portion, the combination of revoluble traction members, hollow lateral extensions at the sides of said body about which the traction members revolve, and means for resiliently supporting said revoluble traction members on said lateral extensions comprising circular ways on said traction members and pneumatic rollers journaled on said extensions engaging said ways to compensate for inequalities in said ways, said pneumatic rollers being tilted with respect to the axis of rotation of the traction members.

11. In a combined land and water vehicle having a main body portion, the combination of an enlarged hollow member extending transversely through and projecting from opposite sides of the body, revoluble traction members journaled on the projecting portions of said hollow members, each traction member having a peripheral portion and axially spaced side walls with the spaces between the side walls of each member substantially sealed by said hollow member, and driving connections for rotating said traction members.

12. In a combined land and water vehicle having a main body portion, the combination of an enlarged hollow member extending transversely through and projecting from opposite sides of the body, revoluble traction members journaled on the projecting portions of said hollow member, each traction member having a peripheral portion and axially spaced side walls with the spaces between the side walls of each member substantially sealed by said hollow member, and driving connections for rotating said traction members, said driving connections comprising ways on said traction members and pneumatic drive rollers journaled on the hollow member engaging said ways, said traction members being free to vibrate relatively to the hollow member and said pneumatic rollers compensating for irregularities in the ways on said traction member.

13. In a combined land and water vehicle having a main body portion, the combination of revoluble traction members, hollow lateral extensions at the sides of said body, a series of compartments disposed around said lateral extensions, said revoluble track members encircling and being revoluble around said extensions and compartments with the compartments located between the extensions and traction members, said extensions having closed ends projecting beyond said traction members at opposite sides of the vehicle, and driving connections for rotating the traction members.

FRANK W. McLARTY.